United States Patent [19]

Tajima et al.

[11] Patent Number: 4,726,652
[45] Date of Patent: Feb. 23, 1988

[54] FARADAY ROTATION SINGLE-MODE OPTICAL FIBER

[75] Inventors: Hidemi Tajima; Toshiharu Yamashita; Isao Masuda, all of Tokyo, Japan

[73] Assignee: Hoya Corporation, Tokyo, Japan

[21] Appl. No.: 947,396

[22] Filed: Dec. 29, 1986

[30] Foreign Application Priority Data

Dec. 28, 1985 [JP] Japan .................. 60-293606

[51] Int. Cl.⁴ .................................. G02B 6/16
[52] U.S. Cl. ...................... 350/96.34; 501/40
[58] Field of Search ............ 350/96.34; 501/78, 35, 501/64, 40

[56] References Cited

U.S. PATENT DOCUMENTS 4,341,873  7/1982  Robinson et al. .............. 501/40

Primary Examiner—John Lee
Assistant Examiner—John Ngo
Attorney, Agent, or Firm—Cushman, Darby & Cushman

[57] ABSTRACT

A Faraday rotation single-mode fiber having a high Verdet constant is disclosed, the core and the cladding of the fiber being made of a glass having the following composition: 26 to 38 mol % $SiO_2$, 18 to 34 mol % $B_2O_3$, 17 to 26 mol % $Al_2O_3$, 18 to 32 mol % $Tb_2O_3$, 0 to 5 mol % $ZrO_2$, 0 to 5 mol % $Ce_2O_3$, 0 to 5 mol % $Pr_2O_3$, 0 to 5 mol % $Dy_2O_3$ and 0 to 5 mol % $Ho_2O_3$, provided that the total amount of the above ingredients is not less than 97 mol % and the total amount of $Ce_2O_3$, $Pr_2O_3$, $Dy_2O_3$ and $Ho_2O_3$ is 0 to 5 mol %.

2 Claims, 4 Drawing Figures

FARADAY ROTATION SINGLE-MODE OPTICAL FIBER

BACKGROUND OF THE INVENTION

The present invention relates to a Faraday rotation single-mode fiber having a high Verdet constant for an optical isolator.

The Faraday effect is a phenomenon that the plane of polarization of a linear polarized light rotates when the light is propagated through a transparent medium placed in a magnetic field and in parallel with the magnetic field, and the effectiveness varies with the strength of the magnetic field, the Verdet constant inherent to the medium and the light path length. A material having a high Verdet constant is utilized for measurement of magnetic field (electric current) or as a Faraday rotator of an optical isolator. An optical isolator comprises a Faraday rotator to rotate by 45° the plane of polarization, a magnet for application of magnetic field or a solenoid, and a polarizer and an analyzer. Conventional optical isolators have all been of the bulk type that no fiber is used. In the fields of optical fiber communication and optical fiber utilizing measurement in which a marked advance has been made in recent years, the necessity of using an optical isolator of the fiber type in the coupling part of a semiconductor laser and a fiber or in the intermediate part of a fiber and a fiber, for example, has been increased.

A fiber type optical isolator in which a fiber is used as a Faraday rotator exhibits the function as an isolator while confining light in the fiber and thus does not need couplings using lenses. Accordingly, the fiber type optical isolator has advantages over the conventional bulk type optical isolator in that the size is small, the weight is light and it is not easy to disorder optical arrayment by external disturbance. This fiber type optical isolator has been studied in Tohoku University, Japan, as described in K. Shiraishi et al., *Applied Optics*, Vol. 23, No. 7, pp. 1103–1106 (Apr. 1, 1984). In the fiber type optical isolator developed in Tohoku University, as a Faraday rotator, a single-mode fiber having a Verdet constant at a wavelength of 633 nm of $-0.25$ min/Oe·cm is used.

The fiber used in the fiber type optical isolator of Tohoku University is a single-mode fiber which has the highest Verdet constant at the present time ("FR-5", produced by HOYA CORPORATION). For this fiber, however, an HL product (strength of magnetic field × light path length) of 10.8 KOe·cm is needed to rotate the plane of polarization by 45°, and thus the magnet used is limited in its miniaturization. Accordingly, to more reduce the size of the optical isolator, a single-mode fiber having a higher Verdet constant is needed.

SUMMARY OF THE INVENTION

An object of the present invention is to provide a single-mode optical fiber comprising the above requirements.

As a result of extensive investigations on a glass composition and drawing conditions, it has been found that a glass having the composition as shown below can be drawn into a fiber form without causing devitrification and can provide a single-mode fiber having a high Verdet constant that had not been attained.

The present invention relates to a Faraday rotation single-mode fiber having a high Verdet constant, the core and the cladding of said fiber being made of a glass having a composition comprising:

| | |
|---|---|
| $SiO_2$ | 26 to 38 mol %, |
| $B_2O_3$ | 18 to 34 mol %, |
| $Al_2O_3$ | 17 to 26 mol %, |
| $Tb_2O_3$ | 18 to 32 mol %, |
| $ZrO_2$ | 0 to 5 mol %, |
| $Ce_2O_3$ | 0 to 5 mol %, |
| $Pr_2O_3$ | 0 to 5 mol %, |
| $Dy_2O_3$ | 0 to 5 mol %, and |
| $Ho_2O_3$ | 0 to 5 mol %, | provided that the total amount of the above ingredients is not less than 97 mol % and the total amount of $Ce_2O_3$, $Pr_2O_3$, $Dy_2O_3$, and $Ho_2O_3$ is from 0 to 5 mol %.

DETAILED DESCRIPTION OF THE INVENTION

In a preferred embodiment of the present invention the glass constituting the core and the cladding is made of a glass having a composition comprising:

| | |
|---|---|
| $SiO_2$ | 26 to 38 mol %, |
| $B_2O_3$ | 18 to 34 mol %, |
| $Al_2O_3$ | 17 to 26 mol %, |
| $Tb_2O_3$ | 18 to 32 mol %, |
| $ZrO_2$ | 0 to 5 mol %, |
| $Ce_2O_3$ | 0 to 5 mol %, |
| $Pr_2O_3$ | 0 to 5 mol %, |
| $Dy_2O_3$ | 0 to 5 mol %, and |
| $Ho_2O_3$ | 0 to 5 mol %, | provided that the total amount of the above ingredients is not less than 97 mol %, the total amount of $Ce_2O_3$, $Pr_2O_3$, $Dy_2O_3$, and $Ho_2O_3$ is from 0 to 5 mol %, and the total amount of $Tb_2O_3$, $Ce_2O_3$, $Pr_2O_3$, $Dy_2O_3$, and $Ho_2O_3$ is more than 20 mol %.

The reasons why the proportions of the ingredients of the present glass are limited to the above specified ranges will hereinafter be explained.

$Tb_2O_3$ is needed to increase the Verdet constant. In order to attain the object of the present invention that the Verdet constant is increased as compared with those of the conventional fibers, the proportion of $Tb_2O_3$ should be not less than 18 mol %. If, however, the proportion of $Tb_2O_3$ is in excess of 32 mol %, devitrification easily occurs and thus drawing cannot be achieved. The proportion of $Tb_2O_3$ is more preferably not more than 28 mol %.

$SiO_2$, $B_2O_3$ and $Al_2O_3$ exert influences on the resistance against devitrification of the glass. Only when $SiO_2$ is 26 to 38 mol %, $B_2O_3$ is 18 to 34 mol % and $Al_2O_3$ is 17 to 26 mol %, a glass which is excellent in the resistance against devitrification and can be drawn, can be obtained.

$ZrO_2$ can be added in a proportion not exceeding 5 mol % as component useful to adjust the refractive index and the viscosity. If, however, the proportion of $ZrO_2$ is in excess of 5 mol %, the tendency of devitrification increases.

$Ce_2O_3$, $Pr_2O_3$, $Dy_2O_3$ and $Ho_2O_3$ are components to increase the Verdet constant, and can be added in such amounts that the total amount thereof does not exceed 5 mol %. In order to achieve the object of the present invention that the Verdet constant is increased, it is preferred that the total amount of $Tb_2O_3$, $Ce_2O_3$, $Pr_2O_3$, $Dy_2O_3$, $Ho_2O_3$ be more than 20 mol %.

In addition, to adjust the refractive index and heat characteristics, the oxides of monovalent and divalent metals (e.g., $Na_2O$, $K_2O$, ZnO, CaO, etc.) can be added in the proportion of 0 to 3 mol %.

Furthermore, a refining agent such as $As_2O_3$ and $Sb_2O_3$ can be added in the proportion of 0 to 0.5 wt. %, and a cladding mode absorber such as $Co_2O_3$, CuO, $Fe_2O_3$, NiO and $V_2O_5$ can be added in total in the proportion of 0 to 1 wt. %, based on the total weight of the glass of the present invention.

Figure 1A:
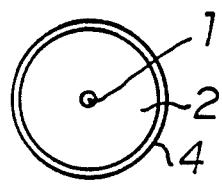
FIG. 1(a) is a cross-sectional view of the fiber used in Examples 1 to 6.
Figure 2A:
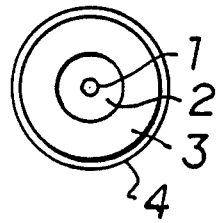
FIG. 2(a) is a cross-sectional view of the fiber used in Example 7.

The fiber of the present invention is of the two layer structure consisting of a core and a cladding as shown in FIG. 1(a), and can be produced by preparing a rod and a tube corresponding to the core and the cladding, respectively, from the glass of the present invention and then drawing them by the rod-in-tube method while controlling the drawing diameter so as to obtain a single-mode fiber. In this case, relative refractive index difference (Δn) between the core and the cladding, and the core radius (a) are determined so that the normalized frequency (V) is not more than 2.405 at a wavelength of light source, as well known as single-mode conditions, as described in *Hikari Tsushin Binran (Manual of Optical Communication)*, 8th Ed., pp. 27-28, published by Kagaku Shinbunsha (August, 1984). The normalized frequency (V), the difference in refractive index (Δn), and the core radius (a) have the following relationship:

$$V = (2\pi/\lambda) a n_1 \sqrt{2\Delta n}$$

wherein λ is a wavelength of light, and $n_1$ is a refractive index of the core. Furthermore, by producing the three layer structure consisting of a core, a cladding and an absorber-added jacket as disclosed in Japanese Patent Application No. 140449/85 as shown in FIG. 2(a), Faraday rotation single-mode fiber of the cladding mode absorption-removal type can be obtained.

The present invention is described in greater detail with reference to the following examples.

EXAMPLES 1-7

Figure 1B:
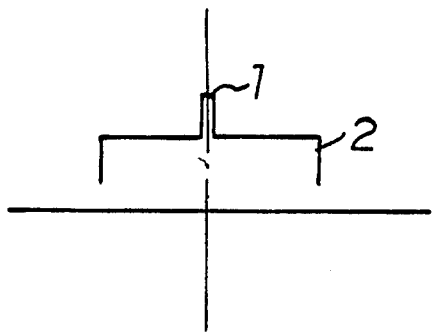
FIG. 1(b) is a graph illustrating the distribution of refractive index in the radial direction of the fiber.

Examples of the present invention are shown in Table 1. Examples 1 to 6 are examples of the core/cladding two layer structure fibers. FIG. 1(a) shows a cross-sectional view of the fiber, and FIG. 1(b) shows the distribution of refractive index in the radial direction of the fiber. In these figures, 1 indicates a core, 2 indicates a cladding and 4 indicates a silicone resin coating. In FIG. 1(b), the vertical axis indicates the height of refractive index and the horizontal axis indicates a location in the radial direction. Concrete values of the relative refractive index difference, the core diameter, and the cladding diameter are shown in Table 1. In addition, the Verdet constant as an important factor for miniaturization of the optical isolator and the liquidus temperature showing the stability of glass are shown in Table 1.

Figure 2B:
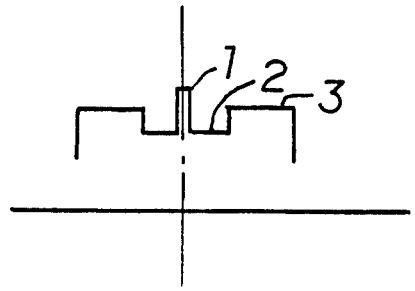
FIG. 2(b) is a graph illustrating the distribution of refractive index in the radial direction of the fiber.

Example 7 is an example of a three layer structure fiber consisting of a core, a cladding and a jacket. FIG. 2(a) indicates a cross-sectional view of the fiber, and FIG. 2(b) indicates the distribution of refractive index in the radial direction. In the figures, 1 indicates a core, 2 indicates a cladding, 3 indicates a jacket and 4 indicates a silicone resin coating. In FIG. 2(b), as in FIG. 1, the vertical axis indicates the height of refractive index and the horizontal axis indicates a location in the radial direction. The concrete values of the relative refractive index difference, the core diameter, the cladding diameter and the jacket diameter are shown in Table 1. The normalized frequency was in the range of 2.16 to 2.35 at a wavelength of 633 nm. This shows that the fiber was a single-mode fiber.

TABLE 1

| Composition (mol %) | Example 1 Core | Example 1 Cladding | Example 2 Core | Example 2 Cladding | Example 3 Core | Example 3 Cladding | Example 4 Core | Example 4 Cladding |
|---|---|---|---|---|---|---|---|---|
| $SiO_2$ | 28.0 | 28.3 | 35.0 | 35.2 | 32.5 | 32.7 | 31.0 | 31.2 |
| $B_2O_3$ | 33.0 | 33.3 | 21.0 | 21.2 | 22.5 | 22.7 | 22.0 | 22.2 |
| $Al_2O_3$ | 18.0 | 17.7 | 23.0 | 22.8 | 20.0 | 19.8 | 20.0 | 19.8 |
| $Tb_2O_3$ | 21.0 | 20.7 | 21.0 | 20.8 | 25.0 | 24.8 | 27.0 | 26.8 |
| $ZrO_2$ | 0 | 0 | 0 | 0 | 0 | 0 | 0 | 0 |
| Others | 0 | 0 | 0 | 0 | 0 | 0 | 0 | 0 |
| Liquidus Temperature (°C.) | 1,180 | | 1,220 | | 1,240 | | 1,260 | |
| Verdet Constant (min/Oe · cm) | −0.27 | | −0.27 | | −0.32 | | −0.34 | |
| Relative Refractive Index Difference (%) | 0.15 | | 0.10 | | 0.10 | | 0.10 | |
| Core Diameter (μφ) | 5.0 | | 6.2 | | 6.0 | | 5.8 | |
| Cladding Diameter (μφ) | 110.0 | | 105.0 | | 100.0 | | 130.0 | |
| Normalized Frequency | 2.30 | | 2.33 | | 2.31 | | 2.24 | |

| Composition (mol %) | Example 5 Core | Example 5 Cladding | Example 6 Core | Example 6 Cladding | Example 7 Core | Example 7 Cladding | Example 7 Jacket |
|---|---|---|---|---|---|---|---|
| $SiO_2$ | 30.0 | 30.2 | 32.0 | 32.2 | 32.5 | 32.7 | 32.6 |
| $B_2O_3$ | 22.0 | 22.2 | 25.5 | 25.7 | 22.5 | 22.7 | 22.6 |
| $Al_2O_3$ | 20.0 | 19.8 | 20.0 | 19.8 | 20.0 | 19.8 | 19.9 |
| $Tb_2O_3$ | 19.0 | 18.8 | 21.0 | 20.8 | 25.0 | 24.8 | 24.9 |
| $ZrO_2$ | 5.0 | 5.0 | 0 | 0 | 0 | 0 | 0 |
| $Ce_2O_3$ | 1.0 | 1.0 | 0 | 0 | 0 | 0 | 0 |
| $Pr_2O_3$ | 1 | 1 | 0 | 0 | 0 | 0 | 0 |
| $Dy_2O_3$ | 1 | 1 | 0 | 0 | 0 | 0 | 0 |
| $Ho_2O_3$ | 1.0 | 1.0 | 0 | 0 | 0 | 0 | 0 |
| $Na_2O$ | 0 | 0 | 1.5 | 1.5 | 0 | 0 | 0 |
| $Co_2O_3$ (wt %) | 0 | 0 | 0 | 0 | 0 | 0 | 0.1 |

TABLE 1-continued

| | | | |
|---|---|---|---|
| Liquidus Temperature (°C.) | 1,250 | 1,230 | 1,240 |
| Verdet Constant (min/Oe · cm) | −0.29 | −0.27 | −0.32 |
| Relative Refractive Index Difference (%) | 0.10 | 0.10 | 0.10 |
| Core Diameter (μφ) | 6.2 | 6.0 | 5.6 |
| Cladding Diameter (μφ) | 120.0 | 100.0 | 30.0 |
| Jacket Diameter (μφ) | — | — | 125.0 |
| Normalized Frequency | 2.35 | 2.22 | 2.16 |

As is shown in Table 1, the single-mode fiber of the present invention has a Verdet constant which is greater then −0.25 min/Oe·cm at a wavelength of 633 nm, the highest value in the conventional fibers. If, therefore, the single-mode fiber of the present invention is used, miniaturization of an optical isolator and other apparatuses can be attained and, furthermore, sensitivity of an apparatus for measurement of magnetic field (electric current) can be increased.

While the invention has been described in detail and with reference to specific embodiments thereof, it will be apparent to one skilled in the art that various changes and modifications can be made therein without departing from the spirit and scope thereof.

What is claimed is:

1. A Faraday rotation single-mode fiber having a core and a cladding which are made of a glass having a composition comprising:

| | |
|---|---|
| $SiO_2$ | 26 to 38 mol %, |
| $B_2O_3$ | 18 to 34 mol %, |
| $Al_2O_3$ | 17 to 26 mol %, |
| $Tb_2O_3$ | 18 to 32 mol %, |
| $ZrO_2$ | 0 to 5 mol %, |
| $Ce_2O_3$ | 0 to 5 mol %, |
| $Pr_2O_3$ | 0 to 5 mol %, |
| $Dy_2O_3$ | 0 to 5 mol %, and |
| $Ho_2O_3$ | 0 to 5 mol %, | provided that the total amount of the above ingredients is less than 97 mol % and the total amount of $Ce_2O_3$, $Pr_2O_3$, $Dy_2O_3$ and $Ho_2O_3$ is from 0 to 5 mol %.

2. The fiber as claimed in claim 1, wherein the amount of $Tb_2O_3$ is from 18 to 28 mol % and the total amount of $Tb_2O_3$, $Ce_2O_3$, $Pr_2O_3$, $Dy_2O_3$, and $Ho_2O_3$ is more than 20 mol %.

* * * * *